US010944117B2

(12) United States Patent
Imamura

(10) Patent No.: US 10,944,117 B2
(45) Date of Patent: Mar. 9, 2021

(54) FUEL CELL VEHICLE

(71) Applicant: HONDA MOTOR CO., LTD., Tokyo (JP)

(72) Inventor: Yuki Imamura, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 43 days.

(21) Appl. No.: 16/362,826

(22) Filed: Mar. 25, 2019

(65) Prior Publication Data
US 2019/0296377 A1 Sep. 26, 2019

(30) Foreign Application Priority Data

Mar. 26, 2018 (JP) .............................. JP2018-058399

(51) Int. Cl.
*H01M 8/04082* (2016.01)
*H01M 8/0267* (2016.01)
*H01M 8/2475* (2016.01)
*H01M 8/2484* (2016.01)
*H01M 8/2483* (2016.01)
H01M 8/1018 (2016.01)

(52) U.S. Cl.
CPC ..... *H01M 8/04201* (2013.01); *H01M 8/0267* (2013.01); *H01M 8/2475* (2013.01); *H01M 8/2483* (2016.02); *H01M 8/2484* (2016.02); H01M 2008/1095 (2013.01); H01M 2250/20 (2013.01)

(58) Field of Classification Search
CPC ........... H01M 8/04201; H01M 8/0267; H01M 8/2475; H01M 8/2484; H01M 8/2483; H01M 2008/1095; H01M 2250/20; H01M 8/0622; H01M 8/2465; B60K 1/00; B60K 1/04; B60K 13/04; B60L 50/72
See application file for complete search history.

(56) References Cited

U.S. PATENT DOCUMENTS

| | | | | |
|---|---|---|---|---|
| 2,841,232 A | * | 7/1958 | Loeffler | F01N 13/082 180/89.2 |
| 3,968,854 A | * | 7/1976 | Gordon | B60K 13/04 181/269 |
| 2003/0017798 A1 | * | 1/2003 | Hanaya | B62D 25/105 454/147 |
| 2003/0037983 A1 | * | 2/2003 | Hanaya | B60K 13/04 180/309 |
| 2010/0297512 A1 | * | 11/2010 | Shinoda | H01M 8/0612 429/423 |
| 2013/0302720 A1 | * | 11/2013 | Ozawa | H01M 8/2484 429/513 |

(Continued)

FOREIGN PATENT DOCUMENTS

JP 2015-193370 11/2015

Primary Examiner — Michael L Dignan
(74) Attorney, Agent, or Firm — Amin, Turocy & Watson, LLP

(57) ABSTRACT

An exhaust device of a fuel cell vehicle includes an exhaust port unit provided in a fender of the fuel cell vehicle, and an exhaust duct coupling a stack case and the exhaust port unit. The exhaust port unit includes a hollow exhaust port body having an outer opening, and a foreign matter entry suppression part in the form of a plate provided in an inner hole of the exhaust port body in a manner that the foreign matter entry suppression part covers at least part of the outer opening.

15 Claims, 9 Drawing Sheets

(56) References Cited

U.S. PATENT DOCUMENTS

| | | | |
|---|---|---|---|
| 2015/0270562 A1* | 9/2015 | Naito | H01M 8/2483 429/458 |
| 2016/0068058 A1* | 3/2016 | Kamimae | B60K 11/06 180/309 |
| 2017/0113531 A1* | 4/2017 | Imamura | H01M 8/2475 |
| 2018/0162216 A1* | 6/2018 | Mizuno | B60K 11/06 |

* cited by examiner

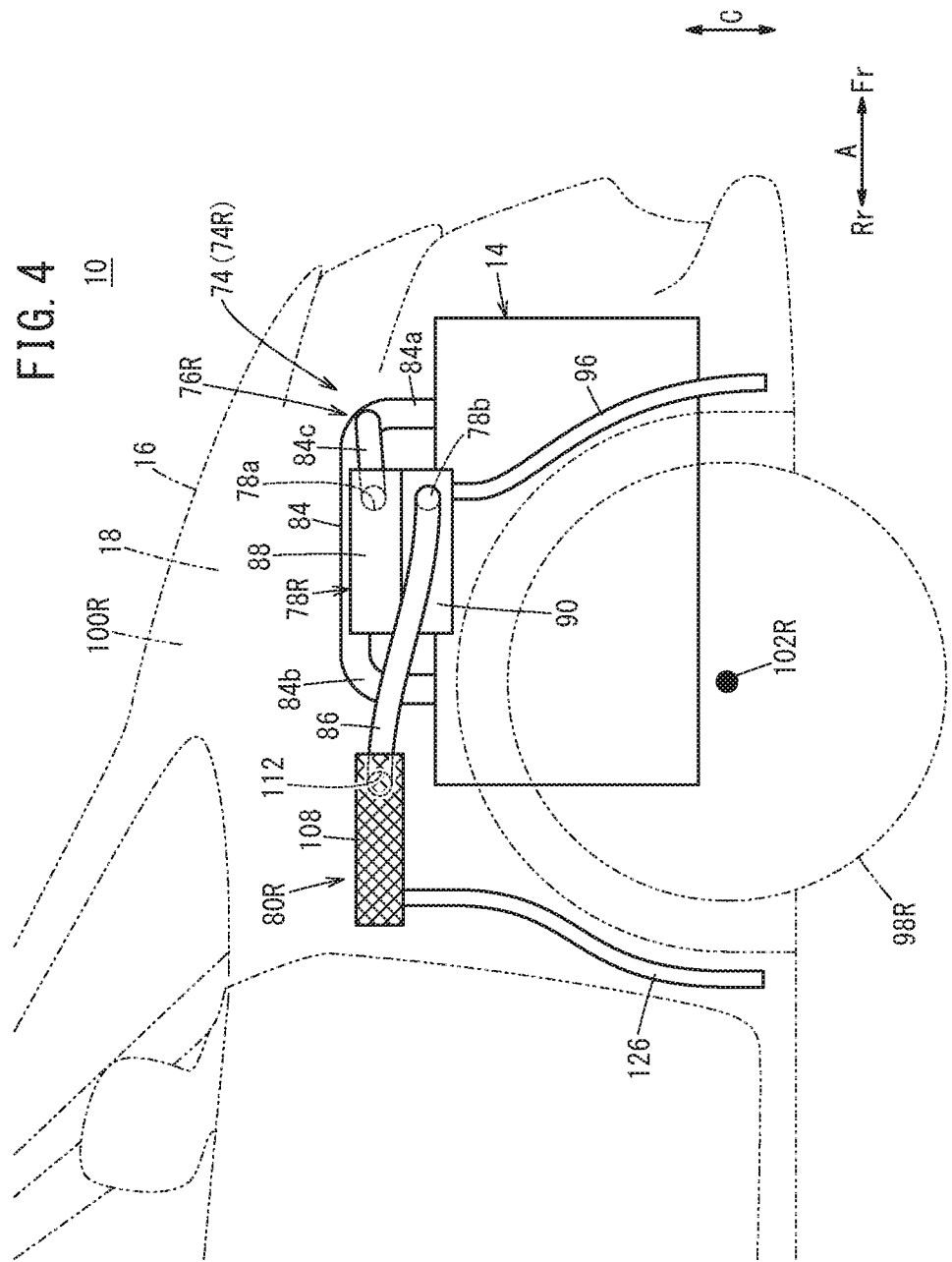

FUEL CELL VEHICLE

CROSS-REFERENCE TO RELATED APPLICATION

This application is based upon and claims the benefit of priority from Japanese Patent Application No. 2018-058399 filed on Mar. 26, 2018, the contents of which are incorporated herein by reference.

BACKGROUND OF THE INVENTION

Field of the Invention

The present invention relates to a fuel cell vehicle including an exhaust device for discharging a fuel gas including an exhaust gas from a stack case containing a fuel cell stack.

Description of the Related Art

For example, a solid polymer electrolyte fuel cell employs a membrane electrode assembly (MEA). The membrane electrode assembly includes an electrolyte membrane, an anode provided on one side of the electrolyte membrane, and a cathode provided on the other side of the electrolyte membrane. The electrolyte membrane is a polymer ion exchange membrane. The membrane electrode assembly is sandwiched between separators to form a power generation cell. In the fuel cell, in general, a predetermined number of power generation cells are stacked together to form, e.g., an in-vehicle fuel cell stack mounted in a fuel cell vehicle.

In the fuel cell vehicle, in particular, hydrogen as a fuel gas may be leaked into space where the fuel cell stack is mounted. Therefore, with a view to discharge the hydrogen to the outside efficiently in the event that leakage of hydrogen from the fuel cell stack occurs, for example, a fuel cell vehicle disclosed in Japanese Laid-open Patent Publication No. 2015-193370 has been proposed. Japanese Laid-open Patent Publication No. 2015-193370 adopts structure where an exhaust duct is connected to a stack case containing a fuel cell stack, and hydrogen is discharged to the outside of the vehicle from the inside of the stack case through the exhaust duct.

SUMMARY OF THE INVENTION

The inside of the stack case is spatially connected to the outside of the vehicle through the exhaust duct. Therefore, there is a concern that water droplets and foreign matters such as, pebbles, metal pieces that are present outside the vehicle may enter the stack case undesirably.

The present invention has been taking the above conventional technique into account, and an object of the present invention to provide a fuel cell vehicle which makes it possible to effectively prevent entry of water droplets and/or foreign matters into the stack case.

A fuel cell vehicle according to the present invention relates to a fuel cell vehicle including an exhaust device configured to discharge an exhaust gas from a stack case containing a fuel cell stack, wherein the exhaust device includes an exhaust port unit provided in a fender of the fuel cell vehicle, and an exhaust duct configured to couple the stack case and the exhaust port unit together, and wherein the exhaust port unit includes a hollow exhaust port body having an outer opening opened to outside of the fuel cell vehicle, and a foreign matter entry suppression part in form of a plate provided in an inner hole of the exhaust port body in a manner that the foreign matter entry suppression part covers at least part of the outer opening.

In the fuel cell vehicle, preferably, the exhaust port body extends in one direction, the foreign matter entry suppression part includes a first plate provided at one end of the exhaust port body in a longitudinal direction and a second plate provided at another end of the exhaust port body in the longitudinal direction, and the first plate and the second plate are offset from each other in a direction in which the outer opening is oriented in a manner that a gap as a passage of the exhaust gas is formed between the first plate and the second plate.

In the fuel cell vehicle, preferably, the first plate and the second plate are overlapped with each other in the direction in which the outer opening is oriented.

In the fuel cell vehicle, preferably, a drain hole is formed at a bottom of the exhaust port body.

In the fuel cell vehicle, preferably, the exhaust device includes a drain pipe, and one end of the drain pipe is connected to the drain hole and another end of the drain pipe is positioned on a vehicle rear side of a front wheel of the fuel cell vehicle.

In the fuel cell vehicle, preferably, the drain hole is formed at one end of the exhaust port body, and the exhaust duct is connected to another end of the exhaust port body.

In the fuel cell vehicle, preferably, a filter case containing a filter is provided in the exhaust duct.

In the fuel cell vehicle, preferably, an intermediate drain hole is formed at a bottom of the filter case.

In the fuel cell vehicle, preferably, the exhaust device includes an intermediate drain pipe, and one end of the intermediate drain pipe is connected to the intermediate drain hole and another end of the intermediate drain pipe is positioned on a vehicle front side of a front wheel of the fuel cell vehicle.

In the fuel cell vehicle, preferably, the exhaust duct includes a pipe configured to couple the filter case and the exhaust port unit, and an outlet port of the filter case connected to one end of the pipe is positioned vertically below an inlet port of the exhaust port unit where another end of the pipe is connected, and the pipe is inclined vertically downward from the inlet port to the outlet port.

In the fuel cell vehicle, preferably, the exhaust port unit includes a cover provided in the exhaust port body in a manner that the cover covers the outer opening from the outside, and a plurality of through holes as passages of the exhaust gas are formed in the cover.

In the present invention, since the foreign matter entry suppression part in the form of a plate is provided in the inner hole of the exhaust port body, it is possible to eliminate and/or reduce situations where the water droplets and/or the foreign matters such as pebbles, or metal pieces flow into the exhaust duct from the outer opening of the exhaust port body. Accordingly, it is possible to suppress entry of the water droplets and/or the foreign matters into the stack case.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 4 is a right side view with partial omission showing a fuel cell vehicle;

DESCRIPTION OF THE PREFERRED EMBODIMENTS

Hereinafter, preferred embodiments of the fuel cell vehicle according to the present invention will be described with reference to the accompanying drawings.

Figure 1:
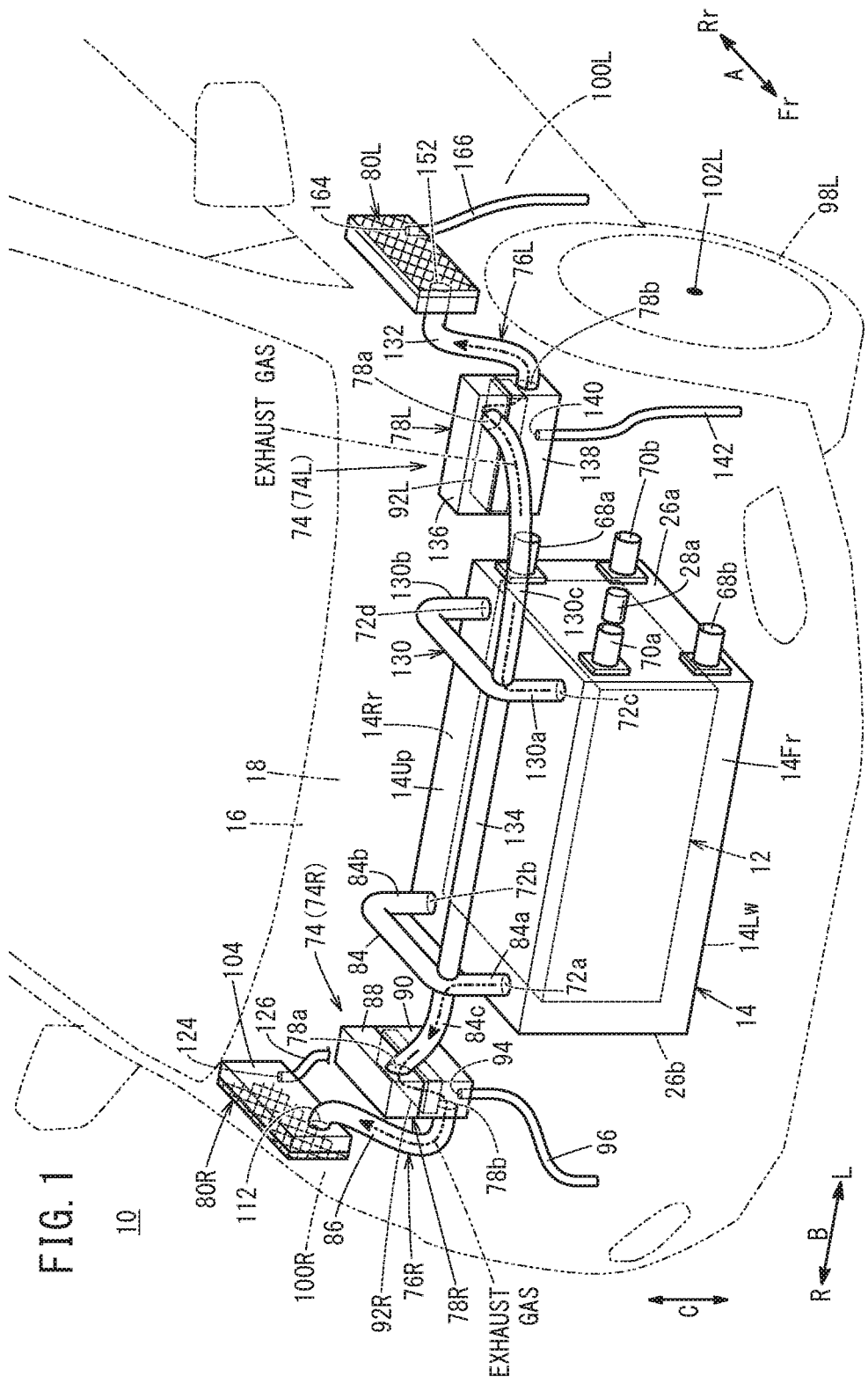
FIG. 1 is a perspective view showing a fuel cell vehicle according to an embodiment of the present invention.

As shown in FIG. 1, for example, a fuel cell vehicle 10 according to an embodiment of the present invention is a fuel cell electric automobile. In the fuel cell vehicle 10, a stack case 14 containing a fuel cell stack 12 is provided in a front room (motor room) 18 formed on the front side of a dash board 16.

Figure 2:
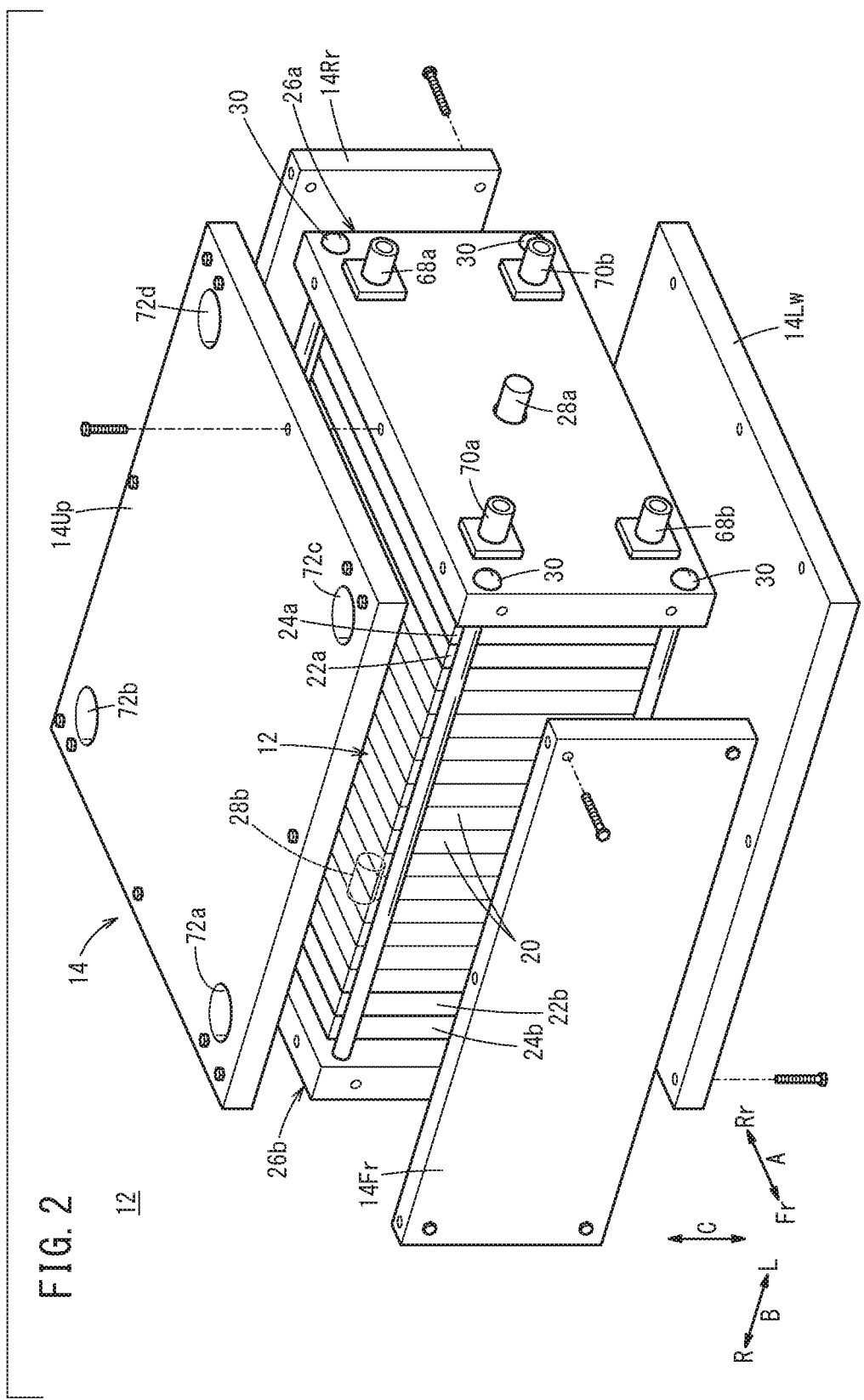
FIG. 2 is an exploded perspective view showing a fuel cell stack.

As shown in FIG. 2, the fuel cell stack 12 is formed by stacking a plurality of power generation cells 20 in a vehicle width direction indicated by an arrow B. A terminal plate 22a is provided at one of the power generation cells 20 in the stacking direction (an end of the power generation cells 20 in a direction indicated by an arrow L). A first insulating plate 24a is provided outside the first terminal plate 22a, and a first end plate 26a is provided outside the first insulating plate 24a.

A second terminal plate 22b is provided at the other end of the power generation cells 20 in the stacking direction (an end of the power generation cells 20 in a direction indicated by an arrow R). A second insulating plate 24b is provided outside the second terminal plate 22b, a second end plate 26b is provided outside the second insulating plate 24b. The first end plate 26a and the second end plate 26b are provided at both ends of the fuel cell stack 12 in the vehicle width direction.

The outer sizes of the first end plate 26a and the second end plate 26b are larger than the outer sizes of the power generation cell 20, the first insulating plate 24a, and the second insulating plate 24b.

The first terminal plate 22a may be placed in a recess inside the first insulating plate 24a, and the second terminal plate 22b may be placed in a recess inside the second insulating plate 24b.

A first power output terminal 28a connected to the first terminal plate 22a protrudes outward from the central part of the first end plate 26a having a laterally elongated shape. A second power output terminal 28b connected to the second terminal plate 22b protrudes outward from the central part of the second end plate 26b having a laterally elongated shape.

Each of corners of the first end plate 26a and the second end plate 26b is fixed by a tie rod 30 extending in the stacking direction to apply a tightening load to the first end plate 26a and the second end plate 26b.

Figure 3:
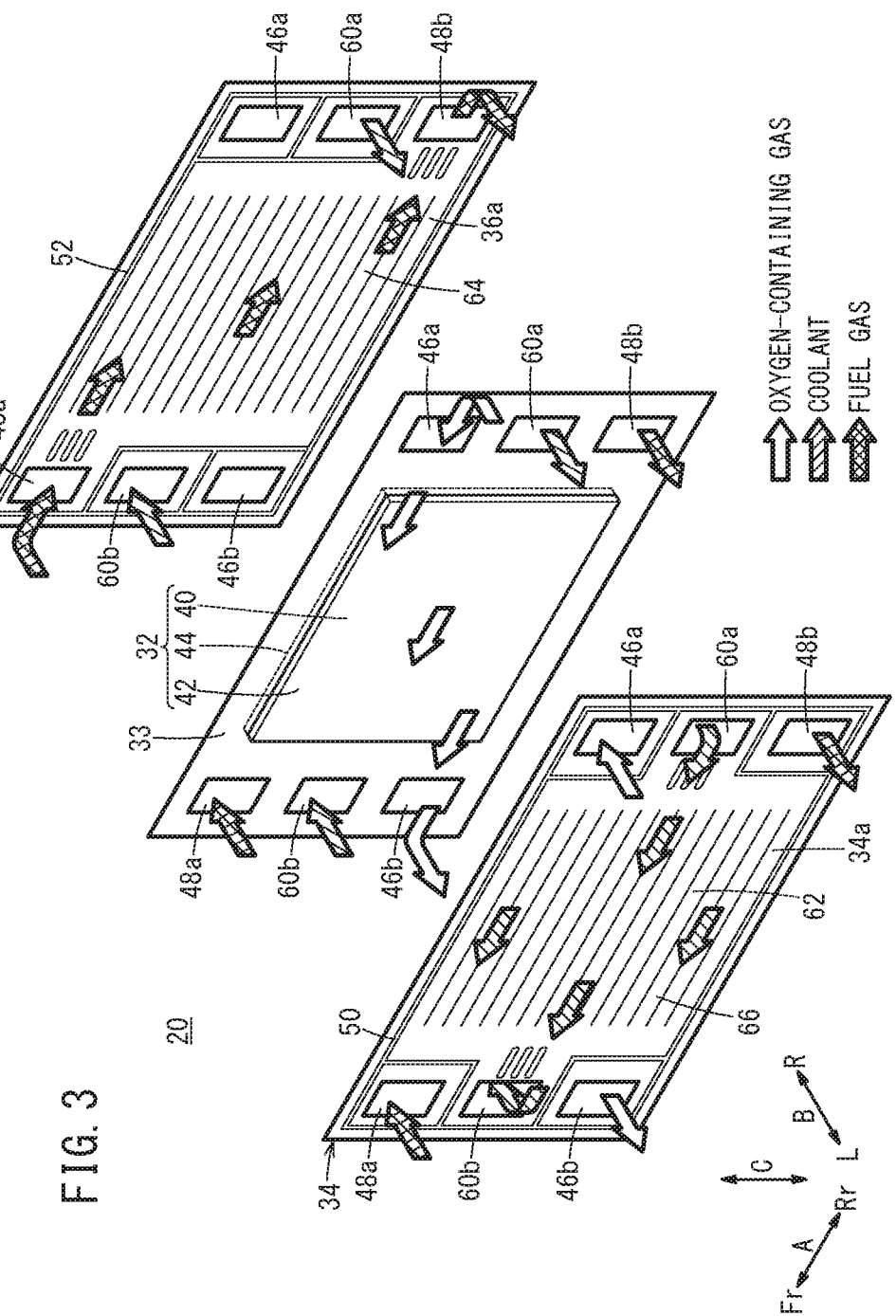
FIG. 3 is an exploded perspective view showing a power generation cell.

As shown in FIG. 3, the power generation cell 20 includes a membrane electrode assembly 32, and a first separator 34 and a second separator 36 sandwiching the membrane electrode assembly 32 from both sides. The membrane electrode assembly 32 includes an electrolyte membrane 40, and a cathode 42 and an anode 44 provided on both sides of the electrolyte membrane 40.

A film shaped resin frame member 33 is provided over the entire periphery of the outer portion of the membrane electrode assembly 32. The first separator 34 and the second separator 36 are metal separators or carbon separators.

At one end of the power generation cell 20 in the direction indicated by an arrow A, an oxygen-containing gas supply passage 46a, a coolant supply passage 60a, and a fuel gas discharge passage 48b are arranged in a vertical direction indicated by an arrow C.

The oxygen-containing gas supply passage 46a extends through each of the power generation cells 20 in the stacking direction of the power generation cells 20 indicated by the arrow B for, e.g., supplying an oxygen-containing gas. The coolant supply passage 60a extends through each of the power generation cells 20 in the direction indicated by the arrow B for supplying a coolant. The fuel gas discharge passage 48b extends through each of the power generation cells 20 in the direction indicated by the arrow B for discharging a fuel gas such as a hydrogen-containing gas.

At the other end of the power generation cell 20, a fuel gas supply passage 48a, a coolant discharge passage 60b, and an oxygen-containing gas discharge passage 46b are arranged in the direction indicated by the arrow C.

The fuel gas supply passage 48a extends through each of the power generation cells 20 in the direction indicated by the arrow B for supplying the fuel gas. The coolant discharge passage 60b extends through each of the power generation cells 20 in the direction indicated by the arrow B for discharging the coolant. The oxygen-containing gas discharge passage 46b extends through each of the power generation cells 20 in the direction indicated by the arrow B for discharging the oxygen-containing gas.

The first separator 34 has an oxygen-containing gas flow field 62 on its surface 34a facing the membrane electrode assembly 32. The oxygen-containing gas flow field 62 is connected to the oxygen-containing gas supply passage 46a and the oxygen-containing gas discharge passage 46b. The second separator 36 has a fuel gas flow field 64 on its surface 36a facing the membrane electrode assembly 32. The fuel gas flow field 64 is connected to the fuel gas supply passage 48a and the fuel gas discharge passage 48b.

A coolant flow field 66 is formed between the first separator 34 and the second separator 36 of the power generation cells 20 that are adjacent to each other. The coolant flow field 66 is connected to the coolant supply passage 60a and the coolant discharge passage 60b. Seal members 50, 52 are formed integrally with, or separately from the first separator 34 and the second separator 36. The seal members 50, 52 contact the resin frame members 33, respectively.

As shown in FIG. 2, an oxygen-containing gas supply manifold 68a and an oxygen-containing gas discharge manifold 68b are provided at one pair of diagonal positions of the first end plate 26a. The oxygen-containing gas supply manifold 68a is connected to the oxygen-containing gas supply passage 46a, and the oxygen-containing gas discharge manifold 68b is connected to the oxygen-containing gas discharge passage 46b.

A fuel gas supply manifold 70a and a fuel gas discharge manifold 70b are provided at the other pair of diagonal positions of the first end plate 26a. The fuel gas supply manifold 70a is connected to the fuel gas supply passage 48a, and the fuel gas discharge manifold 70b is connected to the fuel gas discharge passage 48b.

Though not shown, a coolant supply manifold and a coolant discharge manifold are provided in the second end plate 26b. The coolant supply manifold is connected to the coolant supply passage 60a, and the coolant discharge manifold is connected to the coolant discharge passage 60b.

The fuel cell stack 12 is placed in the stack case 14 having, e.g., a rectangular shape in a plan view. The stack case 14 includes a front side panel 14Fr, a rear side panel 14Rr, an upper panel 14Up, a lower panel 14Lw, the first end plate 26a, and the second end plate 26b.

The components of the stack case 14 are fixed together, and fixed to the first end plate 26a and the second end plate 26b. Openings 72a, 72b, 72c, 72d are formed at four corners of the upper panel 14Up. The openings 72a, 72b, 72c, 72d connect the inside of the stack case 14 to the outside of the stack case 14. It should be noted that the stack case 14 may be provided separately from the fuel cell stack 12, the fuel cell stack 12 may be placed in the stack case 14, and the openings 72a, 72b, 72c, 72d may be provided in the upper surface of the stack case 14.

As shown in FIG. 1, this fuel cell vehicle 10 includes exhaust devices 74 for discharging an exhaust gas from the stack case 14. The exhaust devices 74 are provided on both sides of the stack case 14 in the vehicle width direction. Therefore, the fuel cell vehicle 10 includes the two exhaust devices 74 (74R, 74L).

As shown in FIGS. 1 and 4, the right exhaust device 74R includes an exhaust duct 76R, a filter case 78R, and an exhaust port unit 80R. The exhaust duct 76R couples the stack case 14 and the exhaust port unit 80R together.

Specifically, in FIG. 1, the exhaust duct 76R includes a first pipe 84 and a second pipe 86. The first pipe 84 is connected to the stack case 14 and a first port 78a of the filter case 78R. The second pipe 86 is connected to a second port 78b (outlet port) of the filter case 78R.

The first pipe 84 of the right exhaust duct 76R is connected to two openings 72a, 72b formed on the right side of the upper panel 14Up. It should be noted that the opening 72a may be provided at an upper position of the front side panel 14Fr in the gravity direction, and the opening 72b may be provided at an upper position of the rear side panel 14Rr in the gravity direction. The first pipe 84 includes two connection pipes 84a, 84b and a merge pipe 84c. The connection pipes 84a, 84b are connected to the two openings 72a, 72b. The two connection pipes 84a, 84b are merged into the merge pipe 84c, and the merge pipe 84c is connected to the first port 78a of the filter case 78R.

One end of the second pipe 86 of the right exhaust duct 76R is connected to the second port 78b of the filter case 78R, and the other end of the second pipe 86 of the right exhaust duct 76R is connected to an inlet port 112 of the exhaust port unit 80R. The second port 78b of the filter case 78R is positioned vertically below the inlet port 112. The second pipe 86 is inclined vertically downward from the inlet port 112 toward the second port 78b of the filter case 78R (see FIGS. 1 and 4).

The filter case 78R is positioned on the vehicle front side of a wheel axis 102R of a right front wheel 98R (in the direction indicated by an arrow Fr) (see FIG. 4). The filter case 78R has a shape which extends in a horizontal direction. The filter case 78R has a rectangular shape in a plan view. The longitudinal direction of the filter case 78R is oriented in the front/rear direction of the fuel cell vehicle 10 (indicated by the arrow A).

The longitudinal direction of the filter case 78R may be oriented in the vehicle width direction (indicated by the arrow B), and inclined from the vehicle width direction. The filter case 78R may have a shape other than the rectangular shape in a plan view. For example, the filter case 78R may have a square shape or any other polygonal shape, a circular shape, an ellipse shape (not limited to a geometrically ellipse shape), an oval shape, etc.

At one end of the filter case 78R in the longitudinal direction, the first port 78a and the second port 78b of the filter case 78R are provided. Therefore, the first pipe 84 and the second pipe 86 are connected to one end of the filter case 78R in the longitudinal direction. It should be noted that one of the first pipe 84 and the second pipe 86 may be connected to one end of the filter case 78R in the longitudinal direction, and the other of the first pipe 84 and the second pipe 86 may be connected to the other end of the filter case 78R in the longitudinal direction.

The filter case 78R includes an upper case 88, and a lower case 90 joined to the upper case 88. A filter 92R may be attached to the lower case 90. The first port 78a is provided in the upper case 88. Therefore, the first pipe 84 is connected to the upper case 88. The second port 78b is provided in the lower case 90. Therefore, the second pipe 86 is connected to the lower case 90. It should be noted that the second pipe 86 may be connected to the upper case 88, and the first pipe 84 may be connected to the lower case 90.

An intermediate drain hole 94 is formed at the bottom of the filter case 78R (bottom of the lower case 90). One end of an intermediate drain pipe 96 is connected to the intermediate drain hole 94. The intermediate drain pipe 96 is a pipe for discharging water droplets or foreign matters (pebbles, metal pieces, etc.) which flowed into the filter case 78R, to the outside.

In FIG. 4, the other end of the intermediate drain pipe 96 is positioned inside a wheel house which covers the right front wheel 98R. The other end of the intermediate drain pipe 96 is positioned on the vehicle front side (in the direction indicated by the arrow Fr) of the right front wheel 98R of the fuel cell vehicle 10.

In FIGS. 1 and 4, the right exhaust port unit 80R is provided in a right fender 100R of the fuel cell vehicle 10. Specifically, the exhaust port unit 80R is positioned on the vehicle rear side (in the direction indicated by the arrow Rr) of the wheel axis 102R of the right front wheel 98R of the fuel cell vehicle 10.

Figure 5A:
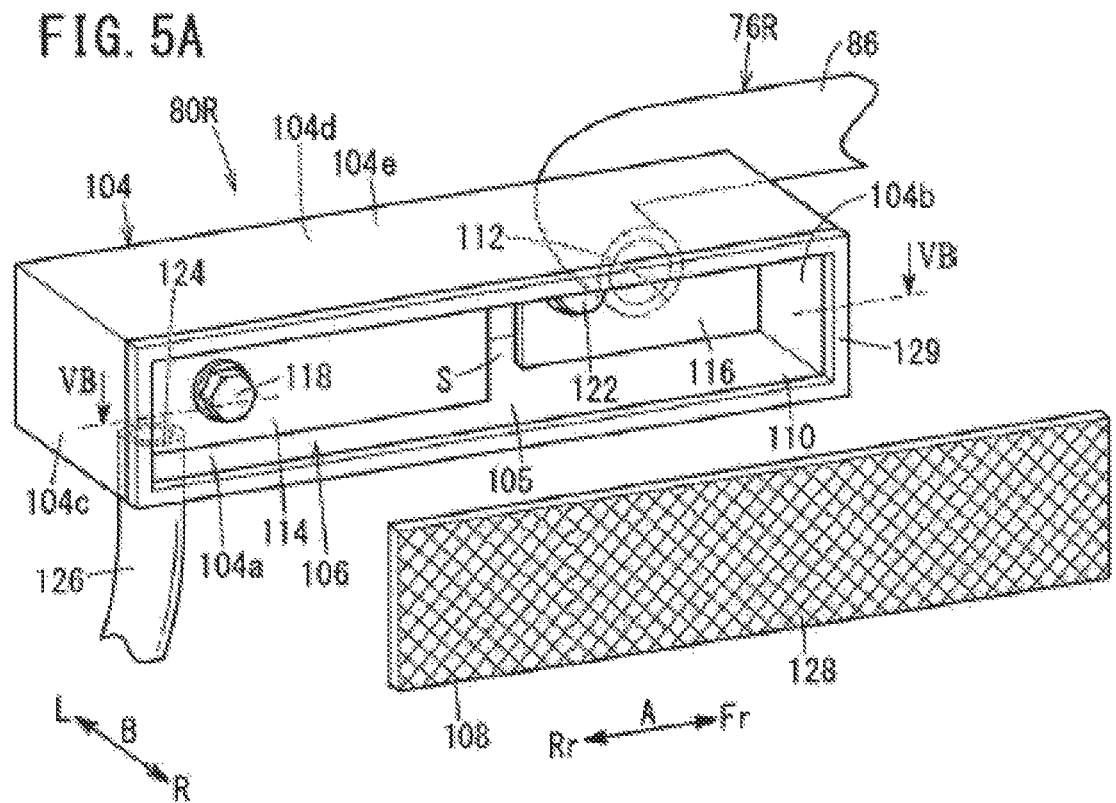
FIG. 5A is a perspective view showing a right exhaust port unit.
Figure 5B:
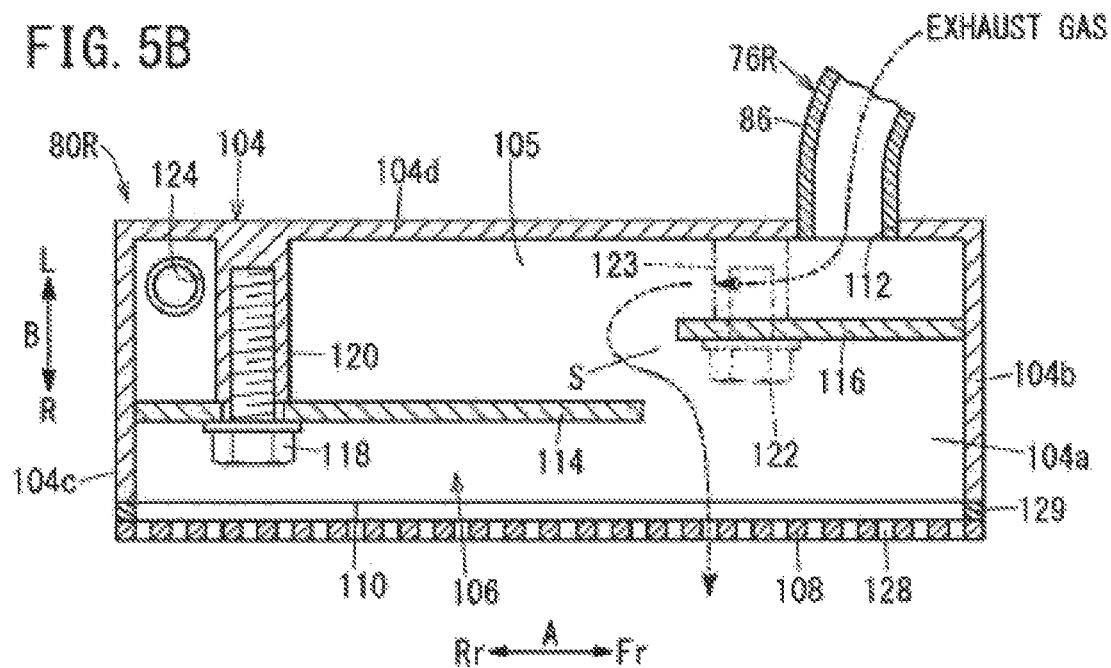
FIG. 5B is a lateral cross sectional view taken along a line VB-VB in FIG. 5A.

As shown in FIGS. 5A and 5B, the exhaust port unit 80R includes an exhaust port body 104, a foreign matter entry suppression part 106, and a cover 108. The exhaust port body 104 extends in one direction in the direction indicated by the arrow A, and includes a bottom wall 104a, a front wall 104b, a rear wall 104c, an inner wall 104d, and a ceiling wall 104e.

An outer opening 110 is formed in the exhaust port body 104. The outer opening 110 is opened to the right side of the fuel cell vehicle 10 in the direction indicated by the arrow R. The outer opening 110 is formed by the bottom wall 104a, the front wall 104b, the rear wall 104c, and the ceiling wall 104e. The outer opening 110 has a rectangular shape. It should be noted that an end of the outer opening 110 in the longitudinal direction may have a circular arc (semi-circular) shape. Further, the lower side of the outer opening 110 may be inclined upward toward the vehicle rear side.

The foreign matter entry suppression part 106 includes a first plate 114 and a second plate 116 provided in an inner hole 105 of the exhaust port body 104 to cover at least part of the outer opening 110.

The first plate 114 is provided at one end of the exhaust port body 104 in the longitudinal direction (an end of the exhaust port body 104 on the vehicle rear side). The first plate 114 is a laterally elongated (rectangular) plate extending in the direction indicate by the arrow A.

One end of the first plate 114 contacts the rear wall 104c. The other end of the first plate 114 is spaced from the front wall 104b. The lower end of the first plate 114 contacts the bottom wall 104a. The upper end of the first plate 114 contacts the ceiling wall 104e. The position of the first plate 114 is shifted inward from the outer opening 110 in the vehicle width direction (indicated by an arrow L).

The first plate 114 is fixed to the exhaust port body 104 by a first bolt 118. The first bolt 118 is tightened to a boss 120 (see FIG. 5B) protruding from the inner wall 104d toward the outer opening 110.

The second plate 116 is provided at the other end of the exhaust port body 104 in the longitudinal direction (end of the exhaust port body 104 on the vehicle front side). The second plate 116 is a laterally elongated (rectangular) plate extending in the direction indicated by the arrow A. The second plate 116 is provided to cover the inlet port 112 from the outside in the vehicle width direction.

One end of the second plate 116 is spaced from the rear wall 104c. The other end of the second plate 116 contacts the front wall 104b. The lower end of the second plate 116 contacts the bottom wall 104a. The upper end of the second plate 116 contacts the ceiling wall 104e.

The second plate 116 is fixed to the exhaust port body 104 using a second bolt 122 (see FIG. 5A). The second bolt 122 is tightened to a boss 123 protruding from the inner wall 104d toward the outer opening 110.

The first plate 114 and the second plate 116 are offset from each other in a direction indicated by the arrow B in which the outer opening 110 is oriented, in a manner that a gap S as a passage of the exhaust gas is formed between the first plate 114 and the second plate 116. The first plate 114 is positioned outside the second plate 116 in the vehicle width direction (indicated by an arrow R).

The first plate 114 and the second plate 116 are not overlapped with each other in a direction in which the outer opening 110 is oriented (indicated by the arrow B). The size of the second plate 116 in the longitudinal direction is shorter than the size of the first plate 114 in the longitudinal direction. However, it should be noted that the size of the second plate 116 in the longitudinal direction may be the same as, or smaller than the size of the first plate 114 in the longitudinal direction.

A drain hole 124 is formed at one end of the exhaust port body 104 in the longitudinal direction (one end of the bottom wall 104a). One end of a drain pipe 126 (see FIG. 5A) is connected to the drain hole 124. The drain pipe 126 is a pipe for discharging the water droplets and/or the foreign matters which flowed into the exhaust port body 104, to the outside of the fuel cell vehicle 10.

As shown in FIG. 4, the other end of the drain pipe 126 is opened to the inside of the wheel house which covers the right front wheel 98R. The other end of the drain pipe 126 is positioned on the vehicle rear side of the right front wheel 98R of the fuel cell vehicle 10 in the direction indicated by the arrow Rr.

As shown in FIGS. 5A and 5B, the inlet port 112 is formed at the other end of the exhaust port body 104 in the longitudinal direction (the other end of the inner wall 104d). The other end of the second pipe 86 is connected to the inlet port 112. The inlet port 112 is covered with the second plate 116.

The cover 108 is provided in the exhaust port body 104 in a manner that the cover 108 covers the outer opening 110 from the outside. The cover 108 is in the form of a mesh. A plurality of through holes 128 as passages of the exhaust gas are formed in the cover 108. A seal member 129 is interposed between the cover 108 and the exhaust port body 104.

The cover 108 may not be in the form of a mesh. The cover 108 may be in the form of a plate having a plurality of slits or a plurality of holes. The cover 108 may be in the form of a porous sheet.

As shown in FIG. 1, the left exhaust device 74L includes an exhaust duct 76L, a filter case 78L, and an exhaust port unit 80L. The exhaust duct 76L couples the stack case 14 and the exhaust port unit 80L together.

Specifically, the exhaust duct 76L includes a first pipe 130 and a second pipe 132. The first pipe 130 is connected to the stack case 14 and the first port 78a of the filter case 78L. The second pipe 132 is connected to a second port 78b (outlet port) of the filter case 78L.

The first pipe 130 of the left exhaust duct 76L is connected to two openings 72c, 72d formed on the left side of the upper panel 14Up. It should be noted that the opening 72c may be positioned at an upper position of the front side panel 14Fr in the gravity direction, and the opening 72d may be positioned at an upper position of the rear side panel 14Rr in the gravity direction. The first pipe 130 includes two connection pipes 130a, 130b, and a merge pipe 130c. The connection pipes 130a, 130b are connected to the two openings 72c, 72d. The two connection pipes 130a, 130b are merged into the merge pipe 130c, and the merge pipe 130c is connected to the first port 78a of the filter case 78L. The first pipe 130 of the left exhaust duct 76L is connected to the first pipe 84 of the right exhaust duct 76R through the coupling pipe 134.

One end of the second pipe 132 of the left exhaust duct 76L is connected to the second port 78b of the filter case 78L, and the other end of the second pipe 132 is connected to an inlet port 152 of the exhaust port unit 80L. The second port 78b of the filter case 78L is positioned vertically below the inlet port 152. The second pipe 132 is inclined vertically downward to extend from the inlet port 152 toward the second port 78b.

The filter case 78L is positioned on the vehicle front side of a wheel axis 102L of a left front wheel 98L (in the direction indicated by the arrow Fr). The filter case 78L has a shape extending in the horizontal direction. The longitudinal direction of the filter case 78L is oriented in the vehicle width direction (indicated by the arrow B). The longitudinal direction of the filter case 78L may be oriented in the front/rear direction of the fuel cell vehicle 10 (indicated by the arrow A), or inclined from the front/rear direction of the fuel cell vehicle 10.

The filter case 78L may have a shape other than the rectangular shape in a plan view. For example, the filter case 78L may have a square shape or any other polygonal shape, a circular shape, an ellipse shape (not limited to a geometrically ellipse shape), an oval shape, etc.

In the illustrated embodiment, the longitudinal direction of the filter case 78L of the left exhaust device 74L and the longitudinal direction of the filter case 78R of the right exhaust device 74R are different from each other. It should be noted that the longitudinal direction of the filter case 78L of the left exhaust device 74L and the longitudinal direction of the filter case 78R of the right exhaust device 74R may be the same.

The first port 78a and the second port 78b of the filter case 78L are provided at one end of the filter case 78L. Therefore, the first pipe 130 and the second pipe 132 are connected to one end of the filter case 78L in the longitudinal direction. It should be noted that one of the first pipe 130 and the second pipe 132 may be connected to one end of the filter case 78L in the longitudinal direction, and the other of the first pipe 130 and the second pipe 132 may be connected to the other end of the filter case 78L in the longitudinal direction.

The filter case 78L includes an upper case 136 and a lower case 138 joined to the upper case 136. A filter 92L may be attached to the lower case 138. A first port 78a is provided in the upper case 136. Therefore, the first pipe 130 is connected to the upper case 136. The second port 78b is provided in the lower case 138. Therefore, the second pipe 132 is connected to the lower case 138. It should be noted that the second pipe 132 may be connected to the upper case 136, and the first pipe 130 may be connected to the lower case 138.

An intermediate drain hole 140 is formed at the bottom of the filter case 78L (bottom of the lower case 138). One end of an intermediate drain pipe 142 is connected to the intermediate drain hole 140. The intermediate drain pipe 142 is a pipe for discharging the water droplets and/or the foreign matters which flowed into the filter case 78L, to the outside.

The other end of the intermediate drain pipe 142 is positioned inside the wheel house covering the left front wheel 98L of the fuel cell vehicle 10. The other end of the intermediate drain pipe 142 is positioned on the vehicle front side (in the direction indicated by the arrow Fr) of the left front wheel 98L of the fuel cell vehicle 10.

The left exhaust port unit 80L is provided in a left fender 100L of the fuel cell vehicle 10. Specifically, the left exhaust port unit 80L is positioned on the vehicle rear side (in the direction indicated by the arrow Rr) of the wheel axis 102L of the left front wheel 98L of the fuel cell vehicle 10.

Figure 6A:
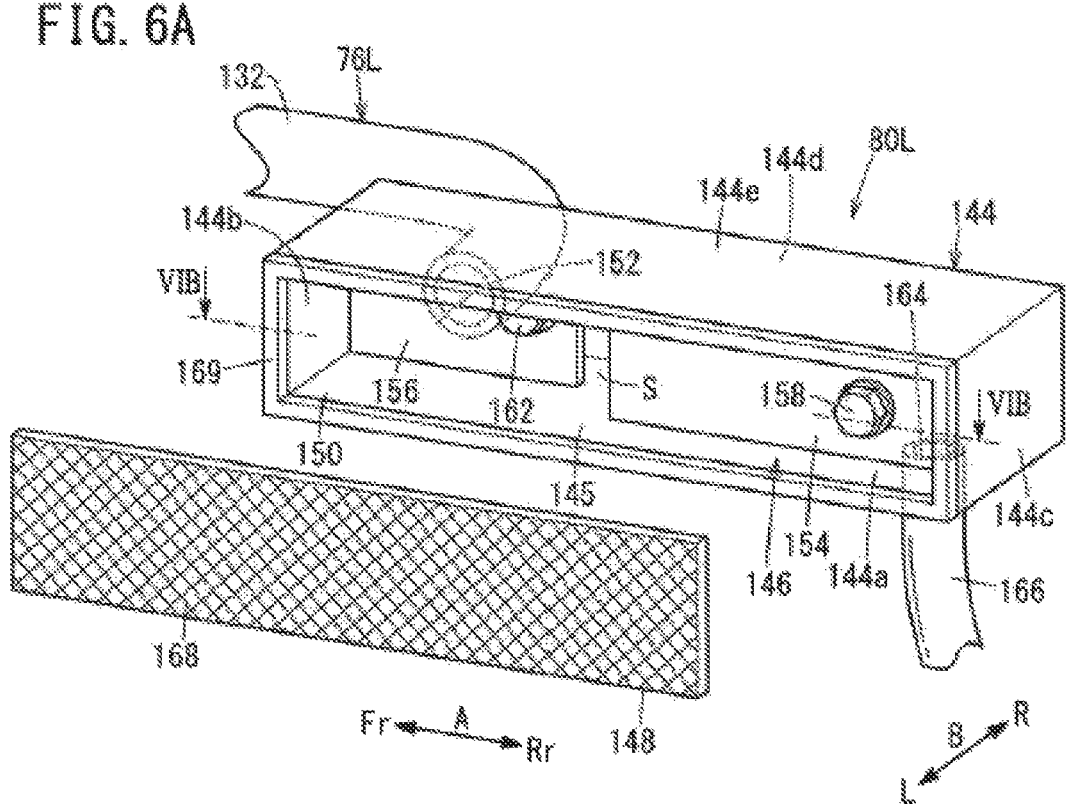
FIG. 6A is a perspective view showing a left exhaust port unit.
Figure 6B:
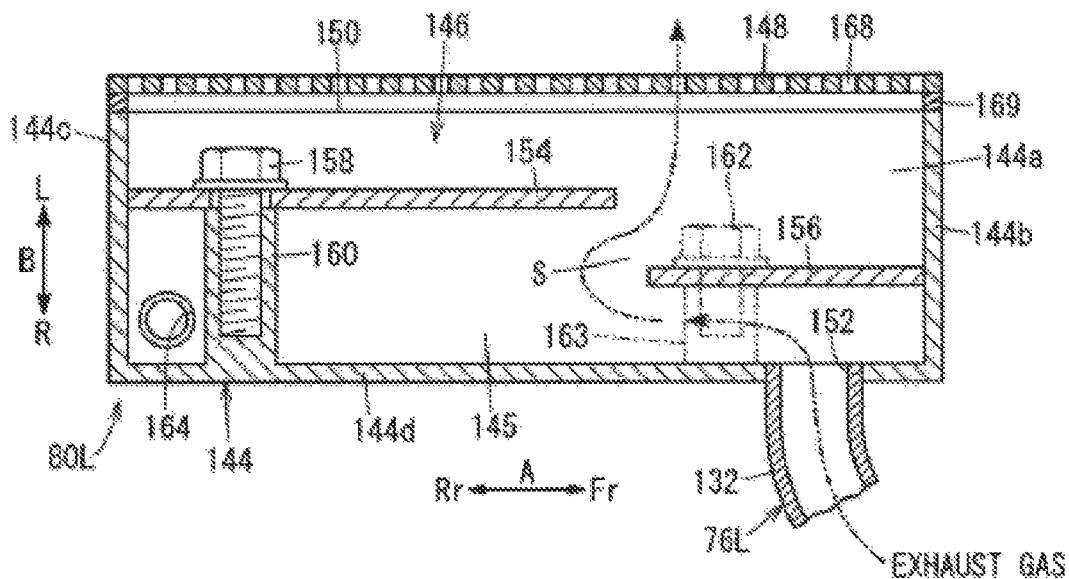
FIG. 6B is a view where the lateral cross section taken along a line VIB-VIB in FIG. 6A is inverted in a lateral direction and a vertical direction by 180°.

As shown in FIGS. 6A and 6B (FIG. 6B is a view where the lateral cross section taken along a line VIB-VIB in FIG. 6A is inverted in a lateral direction and a vertical direction by 180°), the exhaust port unit 80L includes an exhaust port unit 80R includes an exhaust port body 144, a foreign matter entry suppression part 146, and a cover 148. The exhaust port body 144 extends in one direction (indicated by the arrow A), and includes a bottom wall 144a, a front wall 144b, a rear wall 144c, an inner wall 144d, and the ceiling wall 144e.

An outer opening 150 is formed in the exhaust port body 144. The outer opening 150 is opened to the left side of the fuel cell vehicle 10 in the direction indicated by the arrow L. The outer opening 150 is formed by the bottom wall 144a, the front wall 144b, the rear wall 144c, and the ceiling wall 144e. The outer opening 150 has a rectangular shape. It should be noted that an end of the outer opening 150 in the longitudinal direction may have a circular arc (semi-circular) shape. Further, the lower side of the outer opening 150 may be inclined upward toward the vehicle rear side.

The foreign matter entry suppression part 146 includes a first plate 154 and a second plate 156 provided in an inner hole 145 of the exhaust port body 144 in a manner that the first plate 154 and the second plate 156 cover at least part of the outer opening 150.

The first plate 154 is provided at one end of the exhaust port body 144 in the longitudinal direction (an end of the exhaust port body 144 on the vehicle rear side). The first plate 154 is a laterally elongated (rectangular) plate extending in the direction indicate by the arrow A.

One end of the first plate 154 contacts the rear wall 144c. The other end of the first plate 154 is spaced from the front wall 144b. The lower end of the first plate 154 contacts the bottom wall 144a. The upper end of the first plate 154 contacts the ceiling wall 144e. The position of the first plate 154 is shifted inward from the outer opening 150 in the vehicle width direction (indicated by an arrow R).

The first plate 154 is fixed to the exhaust port body 144 by a first bolt 158. The first bolt 158 is tightened to a boss 160 (see FIG. 6B) protruding from an inner wall 144d toward the outer opening 150.

The second plate 156 is provided at the other end of the exhaust port body 144 in the longitudinal direction (end of the exhaust port body 144 on the vehicle front side). The second plate 156 is a laterally elongated (rectangular) plate extending in the direction indicated by the arrow A. The second plate 156 is provided in a manner that the second plate 156 covers the inlet port 152 from the outside in the vehicle width direction.

One end of the second plate 156 is spaced from the rear wall 144c. The other end of the second plate 156 contacts the front wall 144b. The lower end of the second plate 156 contacts the bottom wall 144a. The upper end of the second plate 156 contacts a ceiling wall 144e.

The second plate 156 is fixed to the exhaust port body 144 using a second bolt 162 (see FIG. 6A). The second bolt 162 is tightened to a boss 163 protruding from the inner wall 144d toward the outer opening 150.

The first plate 154 and the second plate 156 are offset from each other in a direction indicated by the arrow B in which the outer opening 150 is oriented, in a manner that a gap S is formed as a passage of the exhaust gas between the first plate 154 and the second plate 156. The first plate 154 is positioned outside the second plate 156 in the vehicle width direction (indicated by an arrow L).

The first plate 154 and the second plate 156 are not overlapped with each other in a direction in which the outer opening 150 is oriented (indicated by the arrow B). The size of the second plate 156 in the longitudinal direction is shorter than the size of the first plate 154 in the longitudinal direction. However, it should be noted that the size of the second plate 156 in the longitudinal direction may be the same as, or smaller than the size of the first plate 154 in the longitudinal direction.

A drain hole 164 is formed at one end of the exhaust port body 144 in the longitudinal direction (one end of the bottom wall 144a). One end of a drain pipe 166 is connected to the drain hole 164. The drain pipe 166 is a pipe for discharging the water droplets and/or foreign matters which flowed into the exhaust port body 144, to the outside of the fuel cell vehicle 10.

As shown in FIG. 1, the other end of the drain pipe 166 is opened to the inside of a wheel house which covers the left front wheel 98L. The other end of the drain pipe 166 is positioned on the vehicle rear side of the left front wheel 98L of the fuel cell vehicle 10 in the direction indicated by the arrow Rr.

As shown in FIGS. 6A and 6B, the inlet port 152 is formed at the other end of the exhaust port body 144 in the longitudinal direction (the other end of the inner wall 144d). The other end of the second pipe 132 is connected to the inlet port 152. The inlet port 152 is covered with the second plate 156.

The cover 148 is provided in the exhaust port body 144 in a manner that the cover 148 covers the outer opening 150 from the outside. The cover 148 is in the form of a mesh. A plurality of through holes 168 as passages of the exhaust gas are formed in the cover 148. A seal member 169 is interposed between the cover 148 and the exhaust port body 144.

The cover 148 may not be in the form of a mesh. The cover 148 may be in the form of a plate having a plurality of slits or a plurality of holes. The cover 148 may be in the form of a porous sheet.

It should be noted that a coupling pipe 134 may be dispensed with. On the right side of the upper panel 14Up, only one opening (one of the openings 72a, 72b or an opening positioned at another position) may be provided, and one connection pipe may be provided in the first pipe 84.

On the left side of the upper panel 14Up, only one opening (one of the openings 72c, 72d or an opening positioned at another position) may be provided, and one connection pipe may be provided in the first pipe 130. An auxiliary device case may be provided adjacent to the stack case 14, and the inside of the auxiliary case may be connected to the stack case 14 (e.g., the auxiliary case may contain devices of the fuel gas supply/discharge system, and devices of the oxygen-containing gas supply/discharge system), and the first pipe 84 or the first pipe 130 may be connected to the auxiliary device case.

Operation of the fuel cell vehicle 10 having the above structure will be described.

During operation of the fuel cell vehicle 10 shown in FIG. 1, a fuel gas is supplied from the fuel gas supply manifold 70a into the fuel gas supply passage 48a. In the meanwhile, the oxygen-containing gas is supplied from the oxygen-containing gas supply manifold 68a to the oxygen-containing gas supply passage 46a.

As shown in FIG. 3, the fuel gas flows from the fuel gas supply passage 48a into the fuel gas flow field 64 of the second separator 36. The fuel gas is supplied along the anode 44 of the membrane electrode assembly 32.

The oxygen-containing gas flows from the oxygen-containing gas supply passage 46a into the oxygen-containing gas flow field 62 of the first separator 34. The oxygen-containing gas is supplied along the cathode 42 of the membrane electrode assembly 32.

Thus, in each of the membrane electrode assemblies 32, the fuel gas (hydrogen gas) supplied to the anode 44 and the oxygen-containing gas (air) supplied to the cathode 42 are partially consumed in the electrochemical reactions in the electrode catalyst layers to generate electricity.

The fuel gas is discharged from the fuel gas discharge passage 48b into the fuel gas discharge manifold 70b. The oxygen-containing gas is discharged from the oxygen-containing gas discharge passage 46b into the oxygen-containing gas discharge manifold 68b.

Further, the coolant is supplied from the coolant supply manifold into the coolant supply passage 60a, and the coolant flows into the coolant flow field 66 between the first separator 34 and the second separator 36. After coolant cools the membrane electrode assembly 32, the coolant flows the coolant discharge passage 60b, and the coolant is discharged into the coolant discharge manifold.

In FIG. 1, in the case where the fuel gas is leaked out of the fuel cell stack 12 into the stack case 14, the air containing the fuel gas (hydrogen gas) is discharged as the exhaust gas, to the outside of the fuel cell vehicle 10 from the exhaust port units 80R, 80L through the exhaust ducts 76R, 76L and the filter cases 78R, 78L.

In this case, the fuel cell vehicle 10 according to the embodiment of the present invention offers the following advantages.

As shown in FIGS. 5A and 5B, the exhaust port unit 80R includes the hollow exhaust port body 104 having the outer opening 110 opened to the outside of the fuel cell vehicle 10, and the foreign matter entry suppression part 106 in the form of a plate provided in the inner hole 105 of the exhaust port body 104 in a manner that the foreign matter entry suppression part 106 covers at least part of the outer opening 110. Therefore, it is possible to suppress entry of the water droplets and/or the foreign matters from the outer opening 110 of the exhaust port body 104 into the exhaust duct 76R. In this manner, it is possible to effectively prevent entry of the water droplets and/or foreign matters into the stack case 14.

The foreign matter entry suppression part 106 includes the first plate 114 provided at one end of the exhaust port body 104 in the longitudinal direction, and the second plate 116 provided at the other end of the exhaust port body 104 in the longitudinal direction. The first plate 114 and the second plate 116 are offset from each other in the direction in which the outer opening 110 is oriented, in a manner that the gap S as the passage of the exhaust gas is formed between the first plate 114 and the second plate 116.

Therefore, it is possible to effectively suppress entry of the water droplets and/or the foreign matters from the outer opening 110 of the exhaust port body 104 into the exhaust duct 76R, by the first plate 114 and the second plate 116. Further, it is possible to discharge the exhaust gas to the outside from the gap S between the first plate 114 and the second plate 116.

The drain hole 124 is formed at the bottom of the exhaust port body 104. In the structure, the water droplets and/or the foreign matters which flowed into the inner hole 105 of the exhaust port body 104 can be discharged from the drain hole 124 to the outside.

In FIG. 4, in the exhaust device 74R, one end of the drain pipe 126 is connected to the drain hole 124, and the other of the drain pipe 126 is positioned on the vehicle rear side of the front wheel 98R of the fuel cell vehicle 10. In the structure, it is possible to eliminate and/or reduce situations where the water droplets/foreign matters discharged from the other end of the drain pipe 126 are directly attached to the front wheel 98R.

As shown in FIGS. 5A and 5B, the drain hole 124 is connected to one end of the exhaust port body 104, and the exhaust duct 76R is coupled to the other end of the exhaust port body 104. In the structure, it is possible to eliminates and/or reduce situations where the water droplets and the foreign matters which flowed from the outer opening 110 of the exhaust port body 104 into the exhaust duct 76R while the water droplets and/or the foreign matters are guided into the drain hole 124.

In FIG. 1, the filter case 78R containing the filter 92R is provided in the exhaust duct 76R. Therefore, even in the case the water droplets and/or the foreign matters flowed from the outer opening 110 of the exhaust port body 104 into the exhaust duct 76R, it is possible to eliminate and/or reduce situations where the water droplets and/or the foreign matters flow into the stack case 14, by the filter 92R.

The intermediate drain hole 94 is formed at the bottom of the filter case 78R. Therefore, it is possible to discharge the water droplets and/or the foreign matters which flowed into the filter case 78R from the intermediate drain hole 94 to the outside.

The exhaust device 74R includes the intermediate drain pipe 96, and one end of the intermediate drain pipe 96 is connected to the intermediate drain hole 94 and the other end of the intermediate drain pipe 96 is positioned on the vehicle front side of the front wheel 98R of the fuel cell vehicle 10. In the structure, it is possible to eliminate and/or reduce situations where the water droplets and/or the foreign matters discharged from the other end of the intermediate drain pipe 96 are directly attached to the front wheel 98R.

The second port 78b of the filter case 78R is positioned vertically below the inlet port 112 of the exhaust port unit 80R, and the second pipe 86 is inclined vertically downward from the inlet port 112 toward the second port 78b of the filter case 78R. Thus, it is possible to effectively guide the water droplets and/or the foreign matters which flowed from the exhaust port unit 80R into the exhaust duct 76R (second pipe 86), into the filter case 78R.

In FIGS. 5A and 5B, the exhaust port unit 80R has the cover 108 provided in the exhaust port body 104 in a manner that a cover 108 covers the outer opening 110 from the outside. The through holes 128 as passages of the exhaust gas are formed in the cover 108. In this manner, it is possible to eliminate and/or reduce situations where the water droplets and/or the foreign matters flow into the inner hole 105 of the exhaust port body 104, by the cover 108.

As shown in FIGS. 6A and 6B, the exhaust port unit 80L includes the hollow exhaust port body 144 having the outer opening 150 opened to the outside of the fuel cell vehicle 10, and the foreign matter entry suppression part 146 in the form of a plate provided in the inner hole 145 of the exhaust port body 144 in a manner that the foreign matter entry suppression part 146 covers at least part of the outer opening 150. In the structure, it is possible to eliminate and/or reduce situations where the water droplets and/or the foreign matters flow from the outer opening 150 of the exhaust port body 144 into the exhaust duct 76L In the structure, it is possible to effectively prevent entry of the water droplets and/or the foreign matters into the stack case 14.

The foreign matter entry suppression part 146 includes the first plate 154 provided at one end of the exhaust port body 144 in the longitudinal direction, and the second plate 156 provided at the other end of the exhaust port body 144 in the longitudinal direction. The first plate 154 and the second plate 156 are offset from each other in the direction in which the outer opening 150 is oriented in a manner that the gap S as the passage of the exhaust gas is formed between the first plate 154 and the second plate 156.

In the structure, it is possible to eliminate and/or reduce situations where the water droplets and/or the foreign matters flow from the outer opening 150 of the exhaust port body 144 into the exhaust duct 76L, by the first plate 154 and the second plate 156. Further, the exhaust gas can be discharged to the outside through the gap S between the first plate 154 and the second plate 156.

The drain hole 164 is formed at the bottom of the exhaust port body 144. In the structure, it is possible to discharge the water droplets and/or the foreign matters which flowed into the inner hole 145 of the exhaust port body 144, from the drain hole 164 to the outside.

In FIG. 1, the exhaust device 74L includes the drain pipe 166, and the one end of the drain pipe 166 is connected to the drain hole 164, and the other end of the drain pipe 166 is positioned on the vehicle rear side of the front wheel 98L of the fuel cell vehicle 10. In the structure, it is possible to eliminate and/or reduce situations where the water droplets and/or the foreign matters discharged from the other end of the drain pipe 166 are directly attached to the front wheel 98L.

As shown in FIGS. 6A and 6B, the drain hole 164 is connected to one end of the exhaust port body 144, and the exhaust duct 76L is coupled to the other end of the exhaust port body 144. Therefore, it is possible to eliminate and/or reduce situations where the water droplets and/or the foreign matters which flowed from the outer opening 150 of the exhaust port body 144 flow into the exhaust duct 76L while the water droplets and/or the foreign matters are guided into the drain hole 164.

In FIG. 1, the filter case 78L containing the filter 92L is provided in the exhaust duct 76L. In the structure, even in the case where the water droplets and/or the foreign matters flowed from the outer opening 150 of the exhaust port body 144 into the exhaust duct 76L, it is possible to eliminate and/or reduce situations where the water droplets and/or the foreign matters flow into the stack case 14, by the filter 92L.

The intermediate drain hole 140 is formed at the bottom of the filter case 78L. In the structure, the water droplets and/or the foreign matters which flowed into the filter case 78L can be discharged to the outside from the intermediate drain hole 140.

The exhaust device 74L includes the intermediate drain pipe 142, and one end of the intermediate drain pipe 142 is connected to the intermediate drain hole 140, and the other end of the intermediate drain pipe 142 is positioned on the vehicle front side of the front wheel 98L of the fuel cell vehicle 10. In the structure, it is possible to eliminate and/or reduce situations where the water droplets and/or the foreign matters discharged from the other end of the intermediate drain pipe 142 are directly attached to the front wheel 98L.

The second port 78b of the filter case 78L is positioned vertically below the inlet port 152 of the exhaust port unit 80L. The second pipe 132 is inclined downward vertically from the inlet port 152 toward the second port 78b of the filter case 78L. In the structure, it is possible to efficiently guide the water droplets and/or the foreign matters which flowed from the exhaust port unit 80L into the exhaust duct 76L (second pipe 132), into the filter case 78L.

In FIGS. 6A and 6B, the exhaust port unit 80L includes the cover 148 provided in the exhaust port body 144 in a manner that the cover 148 covers the outer opening 150 from the outside, and the plurality of holes 168 as passages of the exhaust gas are formed in the cover 148. In the structure, it is possible to eliminate and/or reduce situations where the water droplets and/or the foreign matters flow into the inner hole 145 of the exhaust port body 144, by the cover 148.

The present invention is not limited to the above structure. The fuel cell vehicle 10 may include a right exhaust port unit 80Ra shown in FIG. 7A and a left exhaust port unit 80La shown in FIG. 7B.

Figure 7A:
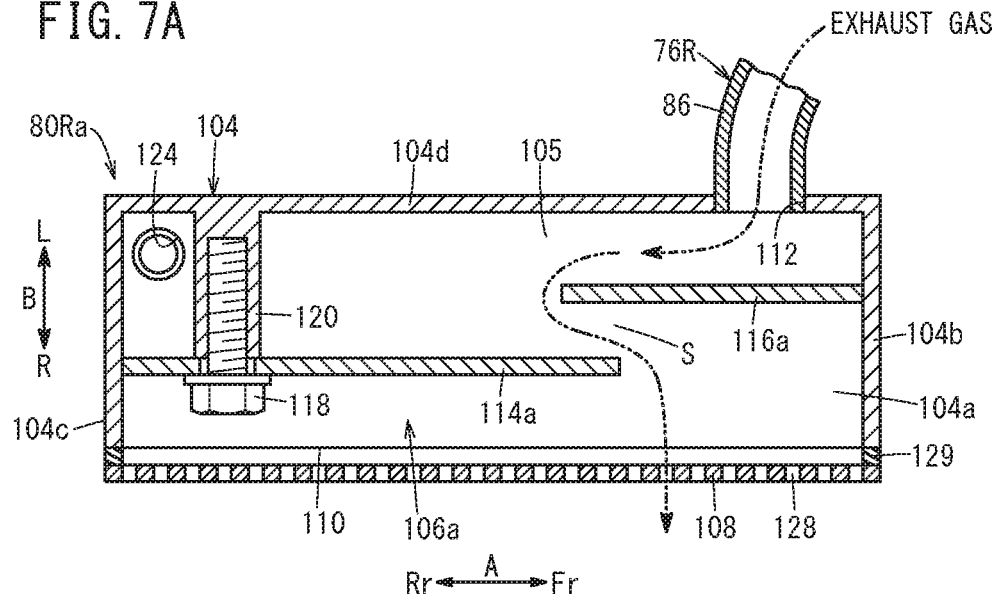
FIG. 7A is a lateral cross sectional view showing a right exhaust port unit according to a first modified embodiment.

As shown in FIG. 7A, a foreign matter entry suppression part 106a of the right exhaust port unit 80Ra includes a first plate 114a and a second plate 116a. The first plate 114a and the second plate 116a are overlapped with other in a direction in which the outer opening 110 is oriented (in the direction indicated by the arrow B). In the structure, it is possible to effectively eliminate and/or reduce situations where the water droplets and/or foreign matters flow from the outer opening 110 of the exhaust port body 104 into the exhaust duct 76R.

Figure 7B:
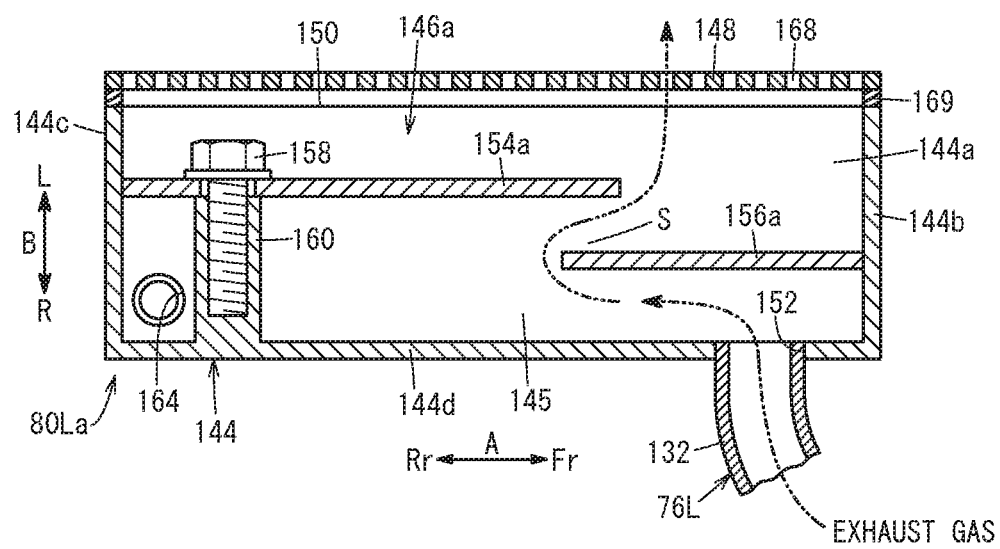
FIG. 7B is a lateral cross sectional view showing a left exhaust port unit according to the first modified embodiment.

As shown in FIG. 7B, a foreign matter entry suppression part 146*a* of the left exhaust port unit 80La includes a first plate 154*a* and a second plate 156*a*. The first plate 154*a* and the second plate 156*a* are overlapped with other in a direction in which the outer opening 150 is oriented (in the direction indicated by the arrow B). In the structure, it is possible to effectively eliminate and/or reduce situations where the water droplets and/or the foreign matters flow from the outer opening 150 of the exhaust port body 144 into the exhaust duct 76L.

Figure 8A:
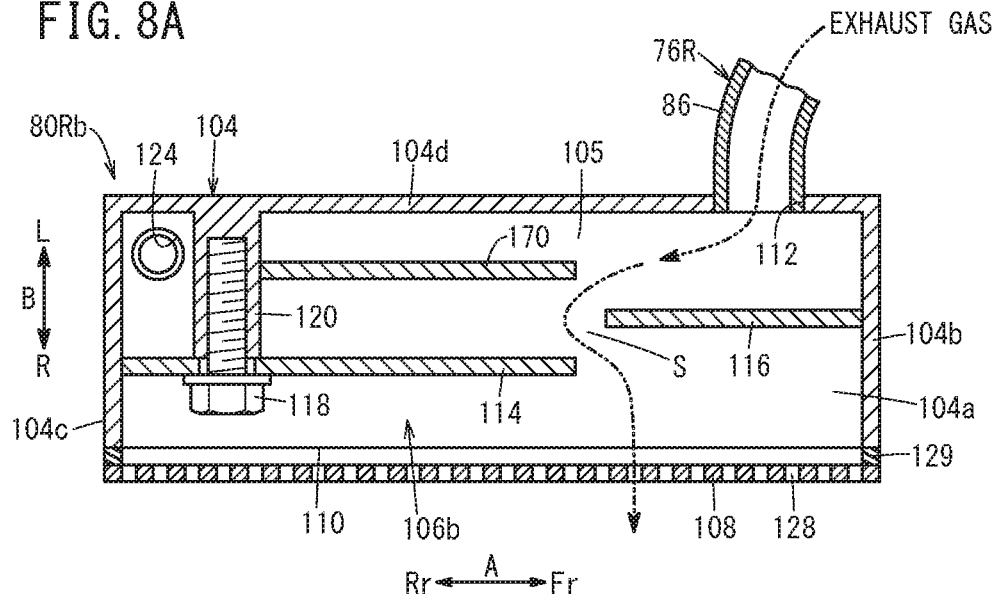
FIG. 8A is a lateral cross sectional view showing a right exhaust port unit according to a second modified embodiment.
Figure 8B:
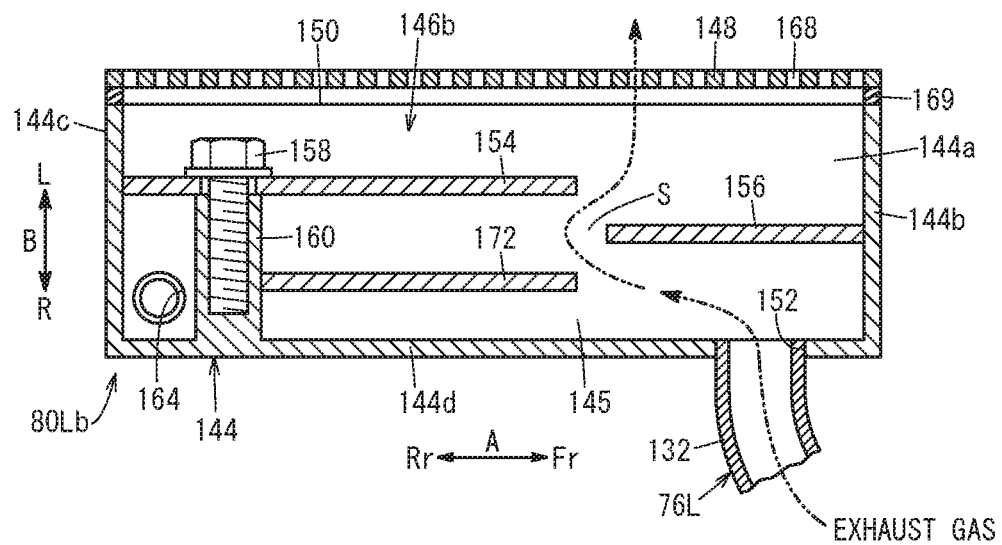
FIG. 8B is a lateral cross sectional view showing a left exhaust port unit according to the second modified embodiment.

The fuel cell vehicle 10 may include a right exhaust port unit 80Rb shown in FIG. 8A and a left exhaust port unit 80Lb shown in FIG. 8B. As shown in FIG. 8A, a foreign matter entry suppression part 106*b* of the right exhaust port unit 80Rb includes a plurality of (two) first plates 114, 170, and a second plate 116.

These first plates 114, 170 are spaced from, and face each other in a direction in which the outer opening 110 is oriented. The first plate 170 is positioned on the inner side of the first plate 114 in the vehicle width direction (indicated by the arrow L). The first plate 170 and the second plate 116 are not overlapped with each other in the direction (indicated by the arrow B) in which the outer opening 110 is oriented. In the structure, it is possible to eliminate and/or reduce situations where the water droplets and/or the foreign matters flow from the outer opening 110 of the exhaust port body 104 into the exhaust duct 76R.

It should be noted that, in the right exhaust port unit 80Rb, the first plate 170 and the second plate 116 may be overlapped with each other in the direction in which the outer opening 110 is oriented. In the right exhaust port unit 80Rb, a plurality of the second plates 116 may be provided to face each other.

As shown in FIG. 8B, a foreign matter entry suppression part 146*b* of the left exhaust port unit 80Lb includes a plurality of (two) first plates 154, 172 and a second plate 156. The first plates 154, 172 are spaced from, and face each other in the direction in which the outer opening 150 is oriented. The first plate 172 is positioned on the inner side of the first plate 154 in the vehicle width direction (indicated by the arrow R).

The first plate 172 and the second plate 156 are not overlapped with each other in the direction in which the outer opening 150 is oriented. In the structure, it is possible to eliminate and/or reduce situations where the water droplets and/or foreign matters flow from the outer opening 150 of the exhaust port body 144 into the exhaust duct 76L to a greater extent.

In the left exhaust port unit 80Lb, the first plate 172 and the second plate 156 may be overlapped with each other in the direction indicated by the arrow B in which the outer opening 150 is oriented. In the left exhaust port unit 80Lb, a plurality of the second plates 156 may be provided to face each other.

Figure 9A:
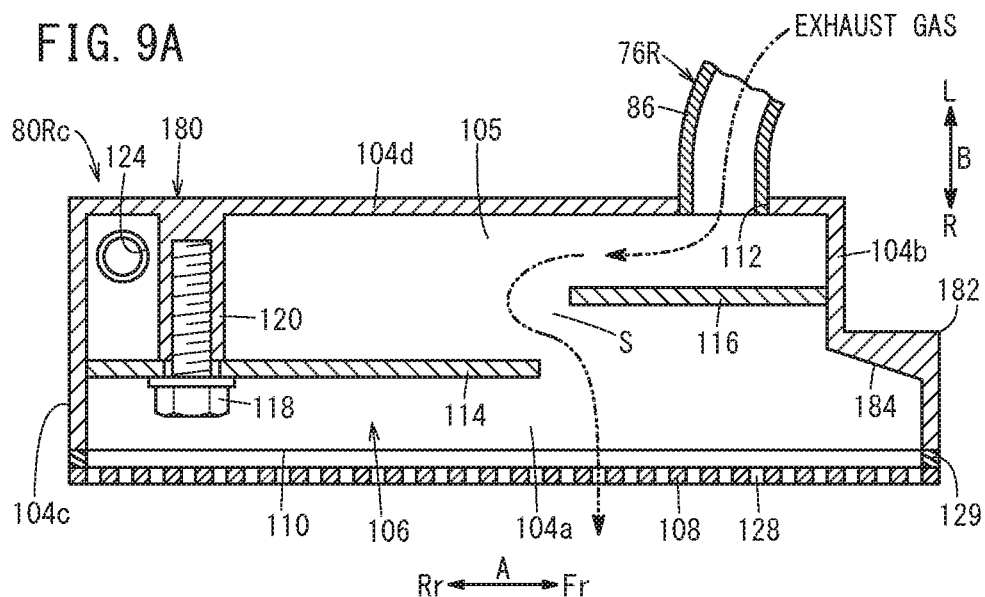
FIG. 9A is a lateral cross sectional view showing a right exhaust port unit according to a third modified embodiment.
Figure 9B:
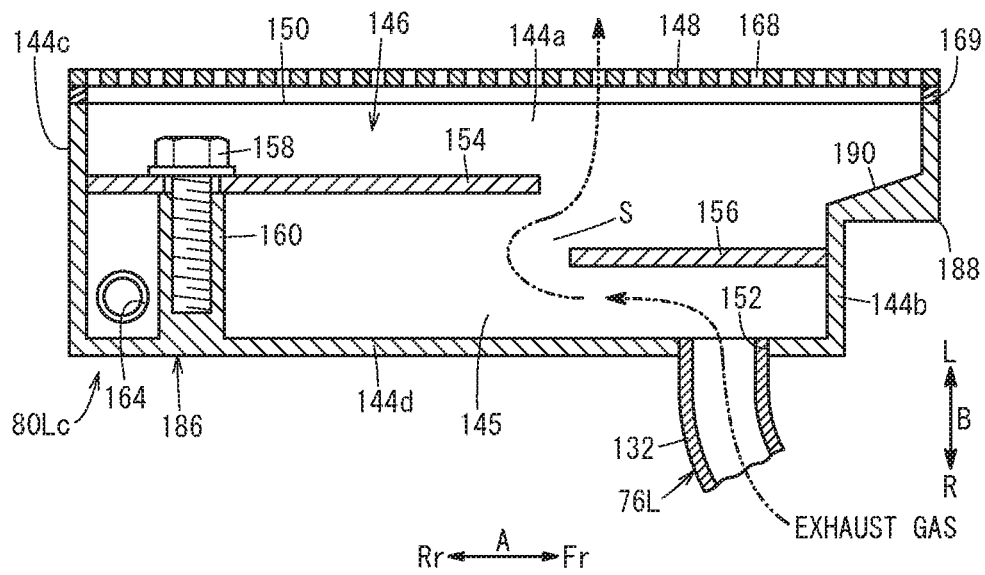
FIG. 9B is a lateral cross sectional view showing a left exhausts port according to the third modified embodiment.

The fuel cell vehicle 10 may include a right exhaust port unit 80Rc shown in FIG. 9A and a left exhaust port unit 80Lc shown in FIG. 9B. As shown in FIG. 9A, an exhaust port body 180 of the right exhaust port unit 80Rc includes an expansion 182. The expansion 182 is expanded toward the vehicle front side (opposite to the first plate 114), from a position in the front wall 104*b* (the other end of the exhaust port body 180), outside the second plate 116 (in the direction indicated by the arrow R in which the outer opening 110 is oriented). An inclined surface 184 is formed in a surface of the expansion 182 oriented outward in the vehicle width direction (oriented toward the outer opening 110). The inclined surface 184 is inclined outward in the vehicle width direction (direction indicated by the arrow R in which the outer opening 110 is oriented), toward the vehicle front side (in the direction in which the expansion 182 is expanded). In the structure, it is possible to suppress stagnation of the exhaust gas at the end of the exhaust port unit 80Rc on the vehicle front side.

As shown in FIG. 9B, an exhaust port body 186 of the left exhaust port unit 80Lc includes an expansion 188. The expansion 188 is expanded toward the vehicle front side (opposite to the first plate 154), from a position in the front wall 144*b* (the other end of the exhaust port body 186), outside the second plate 156 (in the direction indicated by the arrow L in which the outer opening 150 is oriented). An inclined surface 190 is formed in a surface of the expansion 188 oriented outward (oriented toward the outer opening 150) in the vehicle width direction. The inclined surface 190 is inclined inward in the vehicle width direction (direction indicated by the arrow R in which the outer opening 110 is oriented), toward the vehicle rear side (in the direction in which the expansion 188 is expanded). In the structure, it is possible to suppress stagnation of the exhaust gas at the end of the exhaust port unit 80Lc on the vehicle front side.

The numbers of the first plates 114, 114*a*, 154, 154*a*, 170, 172, and the numbers of the second plates 116, 116*a*, 156, 156*a* are not limited to those illustrated in the above described embodiments, and may be determined as necessary. The filter cases 78R, 78L may be dispensed with. The stacking direction of the power generation cells 20 may be oriented in the traveling direction of the fuel cell vehicle 10 indicated by the arrow A.

The present invention is not limited to the above described embodiments. Various modifications may be made

What is claimed is:

1. A fuel cell vehicle including an exhaust device configured to discharge an exhaust gas from a stack case containing a fuel cell stack,
   wherein the exhaust device comprises:
   an exhaust port unit provided in a fender of the fuel cell vehicle; and
   an exhaust duct configured to couple the stack case and the exhaust port unit together, and
   wherein the exhaust port unit comprises:
   a hollow exhaust port body having an outer opening opened to outside of the fuel cell vehicle; and
   a foreign matter entry suppression part in form of a plate provided in an inner hole of the exhaust port body in a manner that the foreign matter entry suppression part covers at least part of the outer opening,
   wherein the exhaust port body includes a front wall and a rear wall and extends between the front wall and the rear wall in a front/rear direction of the fuel cell vehicle; and
   the foreign matter entry suppression part comprises:
   a first plate in contact with the front wall and extending from the front wall in the front/rear direction of the fuel cell vehicle, wherein a distal end of the first plate is distanced from the rear wall;
   a second plate in contact with the rear wall and extending from the rear wall in the front/rear direction of the fuel cell vehicle, wherein a distal end of the second plate is distanced from the front wall, and
   a gap between the first plate and the second plate formed from an offset of the first plate and the second plate in a left/right direction of the fuel cell vehicle, wherein the exhaust duct is in fluid communication with the outer opening via the gap.

2. The fuel cell vehicle according to claim 1, wherein the first plate and the second plate are overlapped with each other in the left/right direction of the fuel cell vehicle.

3. The fuel cell vehicle according to claim 1, wherein a drain hole is formed at a bottom of the exhaust port body.

4. The fuel cell vehicle according to claim 3, wherein the exhaust device comprises a drain pipe, and one end of the drain pipe is connected to the drain hole and another end of the drain pipe is positioned on a vehicle rear side of a front wheel of the fuel cell vehicle.

5. The fuel cell vehicle according to claim 3, wherein the drain hole is formed at one end of the exhaust port body; and
the exhaust duct is connected to another end of the exhaust port body.

6. The fuel cell vehicle according to claim 3, wherein the exhaust port body includes an inner wall connecting the front wall to the rear wall,
the first plate is fixed to the exhaust port body by a bolt, which is tightened to a boss protruding from the inner wall toward the outer opening, and
the bolt and the boss are offset from the drain hole in the longitudinal direction of the exhaust port body.

7. The fuel cell vehicle according to claim 1, wherein a filter case containing a filter is provided in the exhaust duct.

8. The fuel cell vehicle according to claim 7, wherein an intermediate drain hole is formed at a bottom of the filter case.

9. The fuel cell vehicle according to claim 8, wherein the exhaust device comprises an intermediate drain pipe, and one end of the intermediate drain pipe is connected to the intermediate drain hole and another end of the intermediate drain pipe is positioned on a vehicle front side of a front wheel of the fuel cell vehicle.

10. The fuel cell vehicle according to claim 7, wherein the exhaust duct comprises a pipe configured to couple the filter case and the exhaust port unit; and
an outlet port of the filter case connected to one end of the pipe is positioned vertically below an inlet port of the exhaust port unit where another end of the pipe is connected; and
the pipe is inclined vertically downward from the inlet port toward the outlet port.

11. The fuel cell vehicle according to claim 7, wherein the exhaust duct includes a tube connecting the filter case to the exhaust port,
the exhaust port body includes an inner wall connecting the front wall to the rear wall,
the second plate is fixed to the exhaust port body by a bolt, which is tightened to a boss protruding from the inner wall toward the outer opening.

12. The fuel cell vehicle according to claim 1, wherein the exhaust port unit includes a cover provided in the exhaust port body in a manner that the cover covers the outer opening from the outside, and a plurality of through holes as passages of the exhaust gas are formed in the cover.

13. The fuel cell vehicle according to claim 1, wherein a plurality of the first plates are spaced from, and face each other in the left/right direction of the fuel cell vehicle.

14. The fuel cell vehicle according to claim 1, wherein an expansion is provided at the other end of the exhaust port body in the front/rear direction of the fuel cell vehicle, and the expansion is expanded opposite to the first plate, from a position shifted from the second plate in the left/right direction of the fuel cell vehicle in which the outer opening is oriented; and
an inclined surface is formed in a surface of the expansion oriented toward the outer opening, and the inclined surface is inclined in the left/right direction of the fuel cell vehicle in which the outer opening is oriented and the expansion is expanded.

15. The fuel cell vehicle according to claim 1, wherein the first plate and the second plate are not overlapped with each other in the left/right direction of the fuel cell vehicle.

* * * * *